3,050,616
ARC PROCESS AND APPARATUS
Robert M. Gage, Indianapolis, Ind., assignor to Union Carbide Corporation, a corporation of New York
Filed Sept. 9, 1957, Ser. No. 682,918
7 Claims. (Cl. 219—69)

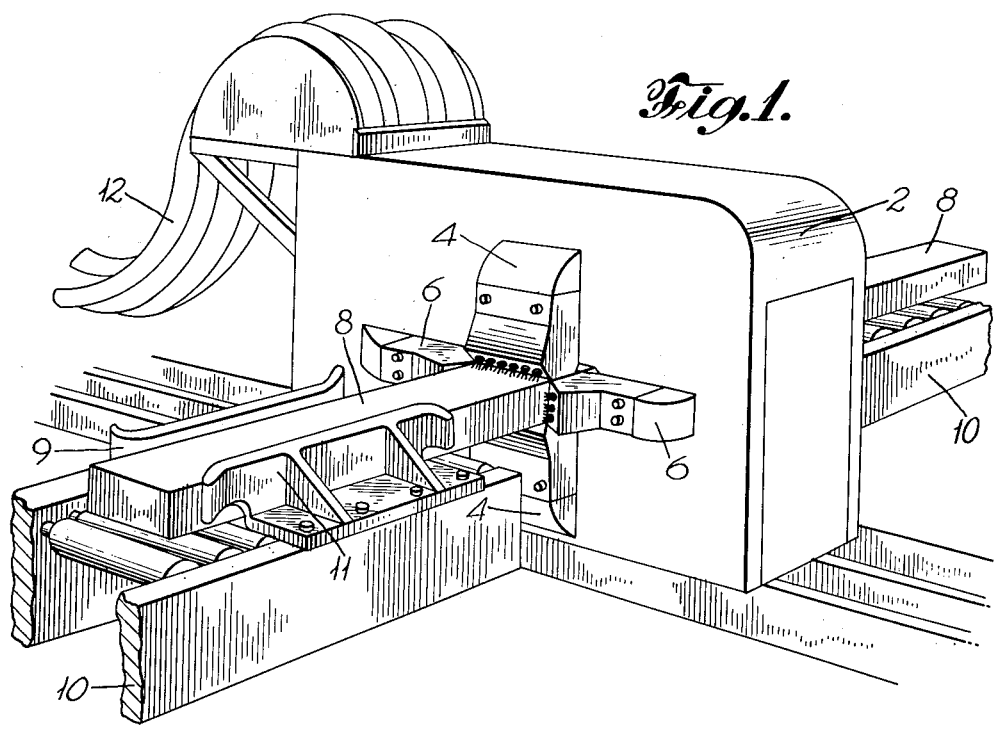

This invention relates to a novel process and apparatus for working the surface of a workpiece with a high-pressure electric arc effluent that is directionally stabilized as disclosed in my application Serial No. 524,353, filed July 26, 1955 (Patent No. 2,806,124, dated September 10, 1957), of which the present application is a continuation-in-part.

As used herein the term "working" includes conditioning deseaming, desurfacing, facing, grooving, gouging, machining, scarfing, skinning, spotting, surfacing, reconditioning, planing, removing, and washing. The workpiece may comprise any electrically conductive material, such as metal that is either ferrous or non-ferrous.

According to the invention an internal directionally stabilized high-pressure arc effluent is applied against the surface of a workpiece at a selected angle between the longitudinal axis of such effluent and a plane that is tangent to the area of such surface against which such effluent is applied, and thereby heating and removing a portion of said workpiece in such surface area with the force and heat of the arc effluent that is so applied.

The workpiece is preferably in the arc circuit for high heat transfer high speed operations. A feature of the invention is the use of a nozzle, which is provided with a passage into which an arc and gas are delivered and in which at least a portion of the arc is wall-stabilized. The shape and direction of the arc-gas effluent between the point of wall-stabilization and the workpiece are controlled to effect the best results.

More particularly, according to the present invention, there is provided a series of high pressure arc torches, arranged preferably transverse to the surface or surfaces of a bar, billet, or bloom, each torch including a relatively non-consumable electrode located axially within a nozzle, said nozzle having passage means into which the gas or gases or gas mixture and the arc are delivered under pressure, controlled and discharged.

It has heretofore been difficult to thermochemically scarf non-ferrous metals because on the surface of these metals a refractory oxide forms which has a melting point substantially higher than the melting point of the metal itself, and such oxide acts to hinder the continuity of the reaction. This is especially true for aluminum, magnesium, nickel, stainless steel, and copper-nickel alloys. The reaction of oxygen with the base metal generally does not produce as much heat as that in the case of iron plus oxygen as in conventional thermochemical scarfing of steel. Therefore, it has been very difficult and in some cases even impossible to scarf non-ferrous metals other than titanium using prior conventional oxygen scarfing technique. To accomplish the desired result, a source of heat having a high intensity and high heat transfer efficiency is used according to the invention to melt the surface of non-ferrous metals. In addition to the arc itself a high velocity stream of gas issuing through the orifice and/or through an auxiliary jet is used to remove the resulting dross and molten metal from the surface.

Heretofore, it was necessary to mechanically remove any defects or roughness on the surface of non-ferrous bodies. With my elongated, stabilized, high intensity, high velocity arc jet, it is now possible to efficiently remove defects or roughness thermally by and with the aid of directional force of the arc effluent.

In operation, this process is usable with either direct current straight polarity, or alternating current with a tungsten electrode. It is also possible to use direct current reverse polarity with water-cooled electrodes made of highly conductive metals such as copper and silver.

Variously shaped orifices may be used depending upon the desired character of metal removal. For example, if a narrow gouge is desired, then a nozzle containing a round orifice may be used. However, if a planing or scarfing type of metal removal is desired, then elliptical or elongated orifices might be preferred. These nozzles should preferably be made of a metal having high thermal conductivity. However, it may be possible to use an insulating material, either as a nozzle insert, or as a surface layer on a highly conductive metal.

The arc may be initiated by using a pilot arc, high-frequency, or by means of a retract-type electrode. Various gases that are suitable may be employed depending upon the workpiece. For example, $CO_2$, argon, air, oxygen, nitrogen, helium, hydrogen, and various combinations of these as well as other gases may be used. It is, of course, necessary to protect the electrode by some gas which will not attack it; however, by using a protective tube around the electrode with an inner shielding gas stream it is possible to employ on the outside of the tube gases reactive to the electrode. Such two gas streams may pass through the torch orifice. Alternatively, the reactive gas stream may be introduced to the arc zone externally of the torch. This latter type of gas includes air, oxygen, nitrogen, hydrogen, and various combinations of these gases.

Depending upon the type of metal, the velocity of the gas in the arc gas effluent or auxiliary jet may be controlled by regulating the pressure and the flow rate. In some instances it is desirable to have low velocity; in others, high velocity. Even velocities in the neighborhood of Mach 10 can be achieved for high speed, high kinetic energy type of surface working operations according to the invention.

The amount of surface metal removed, is dependent on the velocity of the gas stream and the electric power which, in turn, is dependent on the capacity of the power supply. If sufficient electric power is available, any speed can be obtained and any depth of surface working is possible. Using a single electrode, a relatively narrow scarfed width, for example, one-quarter to one-half inch, can be obtained. The following data are typical for producing a relatively narrow (¼ in.) scarf, or series thereof:

| Depth (in.) | Amperage | Voltage | Speed, i.p.m. | Flow, c.f.h. | Torch Angle, degree |
|---|---|---|---|---|---|
| 0.158 | 120 | 70 | 85 | 70 | 50 |
| 0.141 | 150 | 63 | 105 | 70 | 50 |
| 0.123 | 150 | 63 | 130 | 70 | 50 |
| 0.106 | 145 | 63 | 145 | 70 | 50 |
| 0.088 | 140 | 63 | 180 | 70 | 50 |
| 0.088 | 140 | 63 | 200 | 70 | 50 |
| 0.070 | 140 | 60 | 225 | 70 | 50 |
| 0.078 | 130 | 60 | 290 | 70 | 50 |
| 0.035 | 80 | 60 | 290 | 70 | 50 |

However, to obtain wider scarfed areas, it is desirable to use multiple torches, or electrodes adjacent to each other so as to cover, for example, a width of six inches, it would be necessary to use probably 12 electrodes in parallel. Such electrodes have individual power supplies, or all are operated from one power supply provided a ballast resistance is inserted in each electrode circuit. The depth of the scarfed area may be controlled by, of course, the power of the arc and the angle of inclination of the torch. In manual operation, it is preferred that the arct torch move over the workpiece. The molten metal and dross that is ejected by a combination of the arc and gas stream is sprayed over the unscarfed portion, but the so ejected material does not adhere to the workpiece.

For the scarfing of workpieces of any shape, several arc torches are arranged around the perimeter of the workpiece with the torches inclined in a direction opposite to the travel of the workpiece. On a small rectangular bar, arc torches are positioned transversely of the longitudinal axis of the bar so as to remove in a single pass the surface of that side. Then the arcs remove a surface layer of any desired depth, thereby removing all defects.

An unexpected advantage of the invention is the quick starting of metal removal which can be obtained since no preheating of the workpiece is necessary as is the case with conventional oxygen scarfing.

Still another advantage of the invention is that it is possible to get a novel combined arc-oxygen type of metal removal by adding oxygen to the effluent issuing through the orifice or through an auxiliary jet. This has been employed successfully in surfacing working steel, stainless steel, and titanium.

Since oxygen is not always necessary for metal removal, according to the invention, the use of an inert gas eliminates undesirable contamination of the workpiece which is encountered in prior oxygen scarfing. For example, if oxygen were used to scarf titanium, such oxygen would definitely ruin the surface due to the titanium pickup of oxygen. When the invention is employed, however, using an inert gas such as argon or helium or a gas which does not contaminate the base material, such as nitrogen on stainless steel, it is possible to remove the surface layer according to the invention without contaminating the underlying base metal.

The cross-sectional geometry of the surfacing is controlled by adjusting the variables such as the electrical power, the velocity and type of gas used, the angle of the effluent with respect to the workpiece, the size and shape of the orifice, and the number of electrodes or arcs employed. In other words, it is possible to obtain any shape desired and the resultant surface will be satisfactory for subsequent operation such as rolling, extruding, or drawing.

Since this is a very high intensity arc effluent, cold scarfing can be equally as well accomplished as hot scarfing. It of course must be realized that when a hot body is scarfed, the speed using equal power would be much higher than that if the body were cold.

In the drawings:

FIG. 1 is an isometric view of mechanized apparatus for the scarfing of four sides of a billet simultaneously according to the invention;

FIG. 2 is a circuit diagram of the invention connected to one of the scarfing units of FIG. 1, and;

FIG. 3 is a cross-sectional view taken along the line 3—3 of FIG. 2.

Referring more particularly to the drawing, a scarfing station 2 is equipped with four arc torch scarfing units, top and bottom units 4 and two side units 6, for scarfing the four sides of billet 8 simultaneously. Scarfing units 4 and 6, as shown, comprise a row of parallel inner electrodes 26 located within a unitary nozzle electrode block 24 having a corresponding row of parallel outlet passages 30 into which a gas and an arc are delivered under pressure. Passages 28 provide for water cooling of the nozzle electrode block 24. Billet 8 is moved along a roll table 10 and guided into the scarfing station 2 by means of billet guides 9 and 11. Service lines 12 supply water, gas, and electrical current to the arc torch scarfing units.

The arc torch scarfing circuit shown in FIG. 2 consists basically of a power supply 16, a high frequency unit 18, a pilot arc resistor 22, and a bank of proportioning resistors 20 each of which is adjustable. Auxiliary circuits such as gas flow control circuits are not shown. The circuit is so arranged that in initiating the scarfing operation the high frequency unit 18 will establish a pilot arc between the nozzle electrode 24 and an inner electrode 26. Pilot resistor 22 limits the pilot arc to a relatively low current.

The amount of current that passes between each electrode and the workpiece is controlled by the rating of the corresponding resistor 20. Once the pilot arc is initiated, the main arc is then struck between the workpiece and each inner electrode 26.

Power supply 16, supplying the necessary current and voltage, can be either A.C. or D.C. However, when the inner electrode 26 is of a refractory type such as tungsten, a D.C. power supply with straight polarity is preferred. When using high thermal conductivity electrodes such as copper it is desirable to use D.C. power with reverse polarity.

Metal electrodes such as tungsten require non-oxidizing shielding gases such as argon, nitrogen, helium, and hydrogen to protect the electrode from atmospheric contamination. However, oxidizing gases such as air, oxygen, and $CO_2$ may be introduced down stream of the metal electrode and may be introduced through the torch or through an auxiliary orifice. These oxidizing gases may be introduced to augment the scarfing action of the arc effluent with the chemical reaction between the oxygen and the metal. Means for controlling the required gas flows may be either electrical or mechanical.

As an example of the invention, a torch consisting of a 3/32-in. diameter pointed tungsten electrode positioned within a water-cooled copper nozzle having a 1/8-in. diameter orifice was used for this run. The torch was positioned 1/4-in. from a 1/4-in. thick copper workpiece. Argon gas at 50 c.f.h. passed down through the nozzle opening. An arc having a current of 190 amperes was struck between the tungsten electrode and the copper workpiece. The workpiece was then traversed beneath the torch and was gouged at a rate of 35 i.p.m.

What is claimed is:

1. Process of working the surface of a workpiece which comprises applying a directionally stabilized arc effluent against such surface at a selected angle between the longitudinal axis of such effluent and a plane that is tangent to the area of such surface against which such effluent is applied, and thereby heating and removing a portion of said workpiece in such surface area with the force and heat of the arc effluent that is so applied.

2. Process as defined by claim 1, in which the workpiece is electrically conductive and is in-circuit relation with a source of electricity that energizes the arc supporting such effluent.

3. Process as defined by claim 2, in which relative movement is effected between such effluent and surface to heat and remove therewith successive portions of the surface in the direction of such movement.

4. Process as defined by claim 2, in which such selected angle is of the order of 30°.

5. Process which comprises establishing a high-pressure arc between an electrode and a workpiece, wall-stabilizing a portion of the length of such arc, to produce and control the shape and direction of an effluent between the point of such wall-stabilization and said workpiece, and applying the so-controlled effluent to said workpiece, in which such effluent is applied to the workpiece at an acute angle so as to remove surface material from said workpiece by a scarfing action.

6. Process of melting a selected zone of a metal workpiece which comprises connecting the workpiece and an electrode in circuit with a source of arc current, striking an arc between such electrode and such workpiece, wall-stabilizing a portion of the length of such arc with a water-cooled nozzle through which such arc passes, feeding selected gas to the inlet of such nozzle, discharging the resulting directionally stable effluent from the outlet of such nozzle, applying such effluent to such workpiece, and melting such selected zone of metal therewith, in which the metal workpiece is cut by removing the so-melted metal from the rest of the workpiece, and in which the so removed metal is limited to the outer surface of such workpiece.

7. Process as defined by claim 6, in which the cut is a groove obtained by gouging the so-melted metal from such workpiece with said effluent.

References Cited in the file of this patent

UNITED STATES PATENTS

| | | |
|---|---|---|
| Re. 20,035 | Strobel | July 14, 1956 |
| 935,358 | Davis | Sept. 28, 1909 |
| 1,002,721 | Mathers | Sept. 5, 1911 |
| 2,059,236 | Holslag | Nov. 3, 1936 |
| 2,125,172 | Kinzel | July 26, 1938 |
| 2,284,351 | Wyer | May 26, 1942 |
| 2,513,425 | Lobosco | July 4, 1950 |
| 2,806,124 | Gage | Sept. 10, 1957 |

OTHER REFERENCES

"Welding Handbook," 3rd edition 1950, p. 543.